April 12, 1949.  L. E. BARTON  2,466,758
AIRCRAFT FLIGHT SIMULATION PROJECTION DEVICE
Filed Sept. 24, 1947
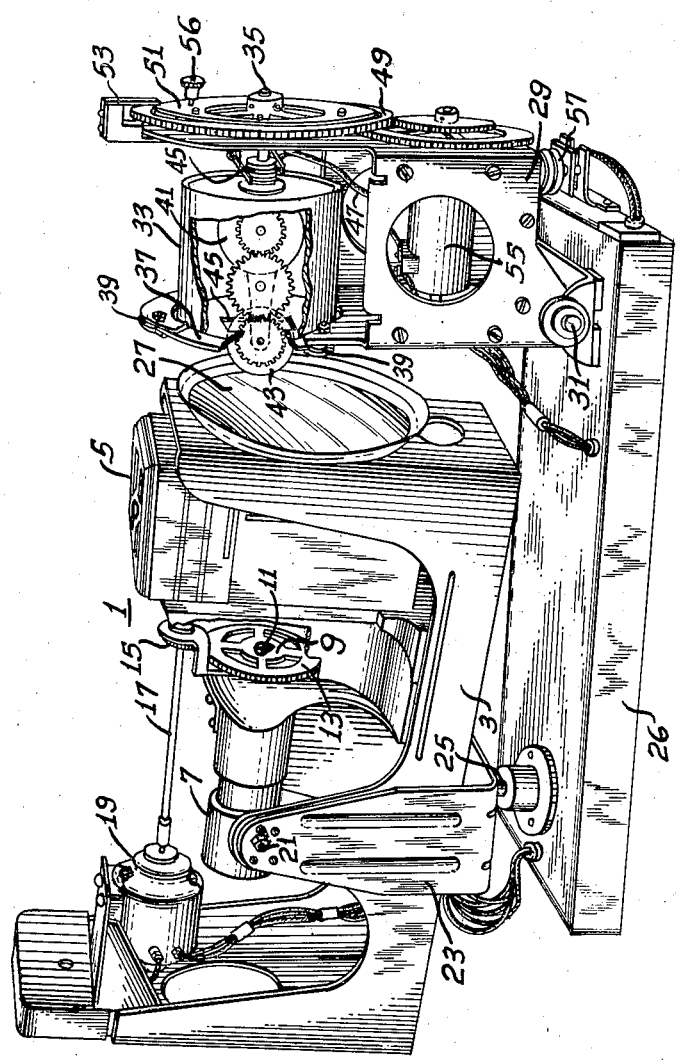
INVENTOR.
Loy E. Barton
BY
ATTORNEY Patented Apr. 12, 1949

2,466,758

UNITED STATES PATENT OFFICE 2,466,758

AIRCRAFT FLIGHT SIMULATION PROJECTION DEVICE

Loy E. Barton, Princeton, N. J., assignor to Radio Corporation of America, a corporation of Delaware Application September 24, 1947, Serial No. 775,871

4 Claims. (Cl. 88—24)

1

This invention relates to navigation particularly of aircraft, and more specifically to simulating or visually depicting the motion of a mobile craft.

The principal object of the invention is to provide an improved mechanism for projecting a luminous marker spot, representing a craft, upon a map or similar representation of the terrain over which the craft is to travel.

Another object is to provide, in a mechanism of the described type, means for giving a visual indication of the heading of the craft whose motion is being displayed.

The invention will be described with reference to the accompanying drawing, wherein the single figure is a perspective representation of a device according to the invention. Certain parts of the outer casing are shown broken away to reveal the internal details of construction.

Referring to the drawing, a projector 1 similar to the type commonly used for exhibiting lantern slides or a projector specially built for the purpose is mounted on a supporting framework 3. The projector 1 includes a lamp housing 5 and a lens system 7. In the space between the lamp housing and lens which, in a slide projector, is occupied by the slide, a mask 9 is provided. In the drawing, the side of the projector is broken away to show the mask 9, which is provided at its center with a small opening 11 shaped like a teardrop. Alternatively, the opening 11 may be in the form of a short arrow or other conventional representation of direction.

The mask 11 is supported on, or may be an integral part of, a gear 13 rotatable about the optical axis of the projector. The gear 13 meshes with a pinion 15 on a shaft 17 coupled to a synchro motor 19. The framework 3 is supported in pivot bearings 21 (only one of which appears in the drawing) on the arms of a fork member 23. The fork 23 is rotatable in a bearing 25 about a vertical axis which intersects the optical axis of the projector 1 at the same point as the horizontal line through the bearings 21 whereby framework 3 is carried in a gimbal whose center of universal movement coincides with this point. The bearing 25 is supported on a base 26. The rear portion of the framework 3 carries a convex friction drive plate 27 shaped like a portion of a sphere. The center of curvature of the drive plate 27 coincides with the intersection of the vertical axis of the bearing 25 and the horizontal axis of the bearings 21.

A second framework 29 is supported on the base 26, pivoted about a horizontal axis at 31. A hol-

2 low drum-shaped member 33 is supported in the framework 29 on a shaft 35 at one end, and upon a flange member 37 at the other. The flange 37 rides on rollers 39 on the front portion of the framework 29. The axis of rotation of the drum 33 intersects the vertical and horizontal axes of rotation of the framework 3 at their common intersection.

The drum 33 contains and supports a small motor 41 geared to a drive wheel 43, which extends through a hole 45 in the front of the drum 33 into contact with the drive plate 27. The point of contact between the wheel 43 and the plate 27 is on the axis of rotation of the drum 33. Slip rings 45 on the shaft 35 connect the motor 41 to leads 47 to its power supply source, not shown.

The shaft 35 carries a gear 49 which is part of a gear train connecting the shaft 35 to a drive motor not visible in the drawing but supported within the lower portion of the framework 29. The gear 49 supports a heading indicator scale 51, calibrated in degrees for indication against a stationary index 53. Also geared to the shaft 35 is a synchro generator 55. The generator 55 is connected to the synchro motor 19 in the customary manner so that the angular position of the rotor of the motor 19 always corresponds to that of the rotor of the generator 55. A compression spring 57 urges the framework 29 in a counterclockwise direction about its pivot axis 31, to maintain contact pressure between the drive wheel 43 and the plate 27.

In the operation of the described device, the lens assembly 7 is adjusted to focus an image of the opening 11 in the mask 9 on a map or similar plan representation of the terrain, not shown. The projector may be moved manually to center the projected spot on the starting point or present location of the craft whose motion is to be depicted. The motor 41 is energized to drive the wheel 43, and thereby the plate 27 and the framework 3, at a speed such that the projected spot moves over the map at a rate corresponding to the ground speed of the craft. The shaft 35 is turned to a position corresponding to the heading of the craft, either by means of a knob 57 or by means of the driving motor geared to the shaft 35.

The angular position of the shaft 35, and hence that of the drum 33, determines the direction in which the wheel 43 drives the plate 27, and thus the direction of motion of the projected spot across the map. The synchro motor 19 drives the gear 13 to maintain the longitudinal axis of the spot in coincidence with the direction of motion with the larger end of the teardrop shaped opening in the lead.

A plurality of projectors like that described, each representing a particular craft, are used with a common map. Each projects a spot moving in accordance with the motion of the craft to which it corresponds. Thus the flights of a number of aircraft simultaneously within a given area may be simulated, and possible conflicts or impending conflicts between them detected. This affords a convenient procedure for setting up schedules of approach and departure at an airport. By following actual aircraft with radar apparatus at a ground station, the various projector mechanisms may be controlled to show on a map the present position and heading of each craft. Thus an observer, for example the flight controller at an airport, may be informed continuously of the traffic situation within his control area.

I claim:

1. A system for visually simulating the flight of an aircraft, including a generally opaque mask having light transmitting portion therein, a light source and a projection lens and means for supporting said mask, lens and light source in operative relationship with each other; a stationary base, and gimbal means carrying said means for supporting for universal movement thereof with respect to said base, a driving plate secured to said means for supporting and having the form of a portion of a spherical surface whose center of curvature coincides with the center of universal movement of said gimbal means; a heading disc supported by said base for rotation about an axis extending through the center of universal movement of said gimbal means, a drive wheel supported on said disc for rotation about an axis perpendicular to the axis of rotation of said heading disc, and means maintaining said drive wheel in contact with said drive plate at a point on said axis of rotation of said disc, and means for rotating said heading disc in accordance with the direction of flight to be simulated.

2. A system for visually simulating the flight of an aircraft, including a generally opaque mask having light transmitting portion therein, a light source and a projection lens and means for supporting said mask, lens and light source in operative relationship with each other; a stationary base, and gimbal means carrying said means for supporting for universal movement thereof with respect to said base, a driving plate secured to said means for supporting, a heading disc supported by said base for rotation about an axis extending through the center of universal movement of said gimbal means, a drive wheel supported on said disc for rotation about an axis perpendicular to the axis of rotation of said heading disc, and means maintaining said drive wheel in contact with said drive plate at a point on said axis of rotation of said disc, and means for rotating said heading disc in accordance with the direction of flight to be simulated.

3. A system for visually simulating the flight of an aircraft, including a generally opaque mask having a light transmitting portion therein, said light transmitting portion having a longitudinal axis and a formation such that one end is distinguishable from the other; a light source and a projection lens on opposite sides of said mask and means for supporting said mask, lens and light source in operative relationship with each other; a stationary base, and gimbal means carrying said means for supporting for universal movement thereof with respect to said base; a driving plate secured to said means for supporting and having the form of a portion of a spherical surface whose center of curvature coincides with the center of universal movement of said gimbal means; a heading disc supported by said base for rotation about an axis extending through the center of universal movement of said gimbal means, a drive wheel supported on said disc for rotation about an axis perpendicular to the axis of rotation of said heading disc, means rotating said drive wheel at a rate corresponding to the ground speed of the aircraft whose flight is to be simulated, and means maintaining said drive wheel in contact with said drive plate at a point on said axis of rotation of said disc; means for rotating said heading disc, and means rotating said mask about the optical axis of said lens in accordance with the rotation of said disc to maintain said longitudinal axis in a direction parallel to the motion of said driving plate.

4. A system for visually simulating the flight of an aircraft, including a generally opaque mask having light transmitting portion therein, said light transmitting portion having a longitudinal axis and a formation such that one end is distinguishable from the other; a light source and a projection lens on opposite sides of said mask and means for supporting said mask, lens and light source in operative relationship with each other; a stationary base, and gimbal means carrying said means for supporting for universal movement with respect to said base, a driving plate secured to said means for supporting and having the form of a portion of a spherical surface whose center of curvature coincides with the center of universal movement of said gimbal means; a heading disc supported by said base for rotation about an axis extending through the center of universal movement of said gimbal means, a drive wheel supported on said disc for rotation about an axis perpendicular to the axis of rotation of said heading disc, and means maintaining said drive wheel in contact with said drive plate at a point on said axis of rotation of said disc; means for rotating said heading disc, and means rotating said mask about the optical axis of said lens in accordance with the rotation of said disc.

LOY E. BARTON.

REFERENCES CITED

The following references are of record in the file of this patent:

UNITED STATES PATENTS

| Number | Name | Date |
|---|---|---|
| 1,052,835 | Littman | Feb. 11, 1913 |
| 1,980,886 | Talafre et al. | Nov. 13, 1934 |
| 2,131,952 | House | Oct. 4, 1938 |
| 2,150,543 | Ybarrondo | Mar. 14, 1939 |
| 2,329,612 | Hill et al. | Sept. 14, 1943 |
| 2,418,512 | Johnson | Apr. 8, 1947 |